(12) United States Patent
Ma et al.

(10) Patent No.: US 7,910,040 B2
(45) Date of Patent: Mar. 22, 2011

(54) MANUFACTURING PROCESS OF CONDUCTIVE POLYMER COMPOSITE BIPOLAR PLATE FOR FUEL CELL HAVING HIGH GAS PERMEABILITY-RESISTANCE AND HEAT-RESISTANCE

(75) Inventors: Chen-Chi Martin Ma, Hsinchu (TW); Hsu-Chiang Kuan, Hsinchu (TW); Han-Lang Wu, Hsinchu (TW); Hsun-Yu Su, Hsinchu (TW); Shu-Hang Liao, Hsinchu (TW); Chuan-Yu Yen, Hsinchu (TW); Yu-Feng Lin, Hsinchu (TW); Ying-Ying Cheng, Hsinchu (TW)

(73) Assignee: National Tsing Hua University (TW)

( * ) Notice: Subject to any disclaimer, the term of this patent is extended or adjusted under 35 U.S.C. 154(b) by 1252 days.

(21) Appl. No.: 11/175,141

(22) Filed: Jul. 7, 2005

(65) Prior Publication Data
US 2006/0267235 A1    Nov. 30, 2006

(51) Int. Cl.
*H01M 4/64*    (2006.01)
(52) U.S. Cl. ........................ 264/319; 429/518
(58) Field of Classification Search ................. 252/514; 205/344; 264/319, 330; 429/518, 519, 520, 429/521, 522
See application file for complete search history.

(56) References Cited

U.S. PATENT DOCUMENTS

| | | | | |
|---|---|---|---|---|
| 3,915,718 | A * | 10/1975 | Ludwig et al. | 106/1.05 |
| 4,348,429 | A * | 9/1982 | McIntyre et al. | 427/125 |
| 6,248,467 | B1 * | 6/2001 | Wilson et al. | 429/39 |
| 2003/0054219 | A1 * | 3/2003 | Won et al. | 429/33 |
| 2003/0168638 | A1 * | 9/2003 | Butler | 252/500 |
| 2004/0094750 | A1 * | 5/2004 | Widagdo et al. | 252/500 |

OTHER PUBLICATIONS

Chen, Teng-Kuei, Li-Hsiang Perng, Kung-Haw Wei, "Reachtion Mechanisms of Synthesized PCL/Clay Nanocomposites", http://web.archive.org/web/20040107124533/http://polymer.che.ncku.edu.tw/papers/E-Nano/E032.pdf, Jan. 7, 2004, p. 1.*

* cited by examiner

*Primary Examiner* — Christina Johnson
*Assistant Examiner* — Galen Hauth
(74) *Attorney, Agent, or Firm* — Bacon & Thomas, PLLC

(57) ABSTRACT

A composite bipolar plate for a polymer electrolyte membrane fuel cell (PEMFC) is prepared as follows: a) compounding vinyl ester and graphite powder to form bulk molding compound (BMC) material, the graphite powder content ranging from 60 wt % to 95 wt % based on the total weight of the graphite powder and vinyl ester, wherein carbon fiber 1-20 wt %, modified organo clay or noble metal plated modified organo clay 0.5-10 wt %, and one or more conductive fillers selected form: carbon nanotube (CNT) 0.1-5 wt %, nickel plated carbon fiber 0.5-10 wt %, nickel plated graphite 2.5-40 wt %, and carbon black 2-30 wt %, based on the weight of the vinyl ester resin, are added during the compounding; b) molding the BMC material from step a) to form a bipolar plate having a desired shaped at 80-200° C. and 500-4000 psi.

19 Claims, No Drawings

MANUFACTURING PROCESS OF CONDUCTIVE POLYMER COMPOSITE BIPOLAR PLATE FOR FUEL CELL HAVING HIGH GAS PERMEABILITY-RESISTANCE AND HEAT-RESISTANCE

FIELD OF THE INVENTION

The present invention relates to a method for preparing a fuel cell composite bipolar plate, particularly a method for preparing a polymer/conductive carbon composite bipolar plate for a fuel cell by a bulk molding compound (BMC) process.

BACKGROUND OF THE INVENTION

Taiwan Patent Publication No. 399348 discloses a method for preparing a bipolar plate, which comprises: mixing at least an electrically conductive material, at least a resin, and at least a hydrophilic agent suitable for a proton exchange membrane fuel cell, to form a substantially homogeneous mixture wherein, based on the weight of said mixture, said at least an electrically conductive material is about 50% to about 95% and said at least a resin is about 5%; and molding said mixture to form a bipolar plate with a desired shape at a temperature of about 250° C. to about 500° C. and a pressure of about 500 psi to about 4000 psi, wherein said at least a resin is selected from the group consisting of thermosetting resins, thermoplastic resins, and a mixture thereof, and said at least an electrically conductive material is selected from the group consisting of graphite, carbon black, carbon fiber, and a mixture thereof.

U.S. Pat. No. 6,248,467 discloses a fuel cell composite bipolar plate, wherein the particle size of the graphite powder is mainly in the range of 80 mesh-325 mesh. This patent has mentioned that the mixing of the resin becomes inhomogeneous during processing when the particle size of the graphite powder is larger than 150 μm.

WO 00/57506 discloses a highly conductive molding composition for molding a fuel cell bipolar plate, wherein the particle size of the graphite powder used is mainly in the range of 44 μm to 150 μm, wherein the amount of the graphite powder larger than 150 μm needs to be lower than 10%, and the amount of the graphite powder smaller than 44 μm also needs to be lower than 10%.

U.S. Pat. No. 4,301,222 discloses a thin electrochemical cell separator plate with greatly improved properties made by molding and then graphitizing a mixture of preferably 50 percent high purity graphite powder and 50 percent carbonizable thermosetting phenolic resin, the graphite molding powder particles having a specified preferred shape and a size distribution requiring 31 to 62 weight percent of the particles to be less than 45 microns in size.

US patent publication No. 2005-0001352 A1 commonly assigned to the assignee of the present application discloses a composite bipolar plate of polymer electrolyte membrane fuel cells (PEMFC) prepared as follows: a) preparing a bulk molding compound (BMC) material containing a vinyl ester resin and a graphite powder, the graphite powder content of BMC material ranging from 60 wt % to 80 wt %, based on the compounded mixture; b) molding the BMC material from step a) to form a bipolar plate having a desired shape at 80-200° C. and 500-4000 psi, wherein the graphite powder is of 40 mesh-80 mesh. Details of the disclosure in US patent publication No. 2005-0001352 A1 are incorporated herein by reference.

To this date, the industry is still continuously looking for a fuel cell bipolar plate having a high electric conductivity, excellent mechanical properties, a high thermal stability and a high gas permeability-resistance.

SUMMARY OF THE INVENTION

One primary objective of the present invention is to provide a fuel cell bipolar plate having a high electrical conductivity, excellent mechanical properties, a high thermal stability and a high gas permeability-resistance.

Another objective of the present invention is to provide a method for preparing a fuel cell bipolar plate having a high electrical conductivity, excellent mechanical properties, a high thermal stability and a high gas permeability-resistance.

In order to accomplished of the aforesaid objectives a process for preparing a composite bipolar plate for a polymer electrolyte membrane fuel cell (PEMFC) according to the present invention comprising: a) compounding vinyl ester and graphite powder to form bulk molding compound (BMC) material, the graphite powder content ranging from 60 wt % to 95 wt % based on the total weight of the graphite powder and vinyl ester, wherein carbon fiber 1-20 wt %, modified organo clay or noble metal plated modified organo clay 0.5-10 wt %, and one or more conductive fillers selected form: carbon nanotube (CNT) 0.1-5 wt %, nickel plated carbon fiber 0.5-10 wt %, nickel plated graphite 2.5-40 wt %, and carbon black 2-30 wt %, based on the weight of the vinyl ester resin, are added during the compounding; b) molding the BMC material from step a) to form a bipolar plate having a desired shaped at 80-200° C. and 500-4000 psi.

Preferably, said modified organo clay in step a) is prepared by conducting an cationic exchange between a modifier and a clay in an acidic solution, separating the resulting ion-exchanged clay from the acidic solution, and drying the ion-exchanged clay, wherein the modifier is used in a ratio of the modifier to the clay of 0.1-10% by weight. Preferably, said modifier comprises a C6-C18 alkane having an amino group and an active hydrogen. More preferably, said modifier is 1,12-diaminododecane.

Preferably, said clay comprises an inorganic layer-type clay having an interlayer space of 8-12 Å and a cation exchange capacity (CEC) of 50-140 meq/100 g. More preferably, said clay is Montmorillonite, Saponite, Hectorite, Attapulgite, zirconium phosphate, Illite, Mica, Kaolinite or Chlorite.

Preferably, said noble metal plated modified organo clay is added during the compounding in step a), and said noble metal plated modified organo clay is prepared by mixing said modified organo clay with a plating solution having noble metal ions dissolved therein; adding a reducing agent to the resulting mixture of said the plating solution and said modified organo clay, so that the noble metal ions are reduced to deposit on said modified organo clay in the form of elemental metal; recovering the noble metal plated modified organo clay by solid-liquid separation; and drying the noble metal plated modified organo clay.

Preferably, said plating solution comprises an aqueous solution with ions of Ag, Cu or Ni dissolved therein. More preferably, said plating solution comprises an aqueous solution of $AgNO_3$, $Cu(NO_3)_2$, or $Ni(NO_3)_3$. Most preferably, said plating solution is an aqueous solution of $AgNO_3$.

Preferably, said reducing agent is $NaBH_4$, $LiB(C_2H_5)_3H$, $LiAlH_4$, formaldehyde or glucose. More preferably, said reducing agent is $NaBH_4$.

Preferably, particles of said graphite powder have a size of 10-80 mesh. More preferably, less than 10 wt % of the particles of the graphite powder are larger than 40 mesh, and the remaining particles of the graphite powder have a size of 40-80 mesh.

Preferably, a free radical initiator in an amount of 1-10% based on the weight of said vinyl ester resin is added during said compounding in step a). More preferably, said free radical initiator is selected from the group consisting of peroxide, hydroperoxide, azonitrile, redox systems, persulfates, and perbenzoates. Most preferably, said free radical initiator is t-butyl peroxybenzoate.

Preferably, a mold releasing agent in an amount of 1-10%, based on the weight of said vinyl ester resin is added during said compounding in step a). More preferably, said mold releasing agent is wax or metal stearate. Most preferably, said mold releasing agent is metal stearate.

Preferably, a low shrinking agent in an amount of 5-20%, based on the weight of said vinyl ester resin is added during said compounding in step a). More preferably, said low shrinking agent is selected from the group consisting of styrene-monomer-diluted polystyrene resin, copolymer of styrene and acrylic acid, poly(vinyl acetate), copolymer of vinyl acetate and acrylic acid, copolymer of vinyl acetate and itaconic acid, and terpolymer of vinyl acetate, acrylic acid and itaconic acid. Most preferably, said low shrinking agent is styrene-monomer-diluted polystyrene resin.

Preferably, a tackifier in an amount of 1-10%, based on the weight of said vinyl ester resin is added during said compounding in step a). More preferably, said tackifier is selected from the group consisting of alkaline earth metal oxides, alkaline earth metal hydroxides, carbodiamides, aziridines, and polyisocyanates. Most preferably, said tackifier is calcium oxide or magnesium oxide.

Preferably, a solvent in an amount of 10-35%, based on the weight of said vinyl ester resin is added during said compounding in step a). More preferably, said solvent is selected from the group consisting of styrene monomer, alpha-methyl styrene monomer, chloro-styrene monomer, vinyl toluene monomer, divinyl toluene monomer, diallylphthalate monomer, and methyl methacrylate monomer. Most preferably, said solvent is styrene monomer.

The vinyl ester resins suitable for use in the present invention have been described in U.S. Pat. No. 6,248,467 which are (meth)acrylated epoxy polyesters, preferably having a glass transition temperature (Tg) of over 180° C. Suitable examples of said vinyl ester resins include, but not limited to, bisphenol-A epoxy-based methacrylate, bisphenol-A epoxy-based acrylate, tetrabromo bisphenol-A epoxy-based methacrylate, and phenol-novolac epoxy-based methacrylate, wherein phenol-novolac epoxy-based methacrylate is preferred. Said vinyl ester resins have a molecular weight of about 500~10000, and an acid value of about 4 mg/1 hKOH-40 mg/1 hKOH.

Preferably, said carbon fiber and said nickel plated carbon fiber have a length of 1-10 mm and have a yarn size of 5-24 K. Said nickel plated carbon fiber has 10-30% nickel plated on its surface, based on the weight of the un-plated carbon fiber Preferably, said carbon nanotube (CNT) is a single-walled CNT or a multi-walled CNT having a tube diameter of 0.7-50 nm, a tube length of 1-1000 μm, and a specific surface area of 40-300 m$^2$/g.

DETAILED DESCRIPTION OF THE INVENTION

According to the present invention, a composite bipolar plate is produced by a bulk molding compound (BMC) process using a vinyl ester resin and an electrically conductive carbon material including modified organo clay and silver plated modified organo clay. The composite bipolar plate prepared according to the present invention has a sufficiently high electric conductivity with an enhanced mechanical properties and gas permeability-resistance, while meeting flame retardant demands.

In the following examples, the modified organ Montmorillonite (organic MMT) and silver plated modified organo Montmorillonite (Ag-plated MMT) are prepared as follows:

A) mixing 20 g of a Montmorillonite and 200 ml of deionized water; adding the resulting mixture together with 3.08 g (15.4 mmole) 1,12-diaminododecane to 800 ml deionized water; then adding 2.4 ml of concentrated HCl acid; stirring the resulting mixture at 50° C. for 8 hrs; filtering out the clay and washing with deionized water until no white precipitate of AgCl is formed when the spent water is titrated with an aqueous solution AgNO$_3$; drying the washed clay in an oven at 100° C., and grounding and sieving the dried clay to obtain organic MMT;

B) to 200 ml of deionized water 5.4 g of the organic MMT prepared in A) and 1.7 g (0.01 mole) of AgNO$_3$ are added, the resulting mixture is stirred at room temperature for 2 hrs, NaBH$_4$ aqueous solution is added in an amount of 0.04 mole of NaBH$_4$ is added, the resulting mixture is stirred for 2 hrs, the solid is recovered by centrifugation, drying the washed clay in an oven at 100° C., followed by drying, grounding and sieving to obtain Ag-plated organic MMT.

In the following examples and controls, the vinyl ester resins and initiators used are:

Vinyl ester resin: phenolic-novolac epoxy-based (methacrylate) resin having the following structure, which is available as code SW930-10 from SWANCOR IND. CO., LTD, No. 9, Industry South 6 Rd, Nan Kang Industrial Park, Nan-Tou City, Taiwan:

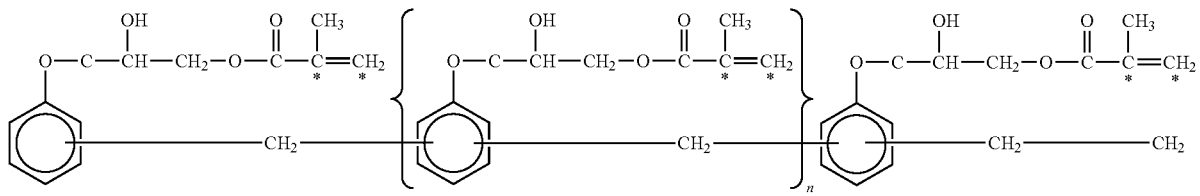

wherein n = 1~3.

Initiator: t-Butyl peroxybenzoate (TBPB) having the following structure, which is available as code TBPB-98 from Taiwan Chiang-Ya Co, Ltd., 4 of 8$^{th}$ Fl, No. 345, Chunghe Rd, Yuanhe City, Taipei Hsien:

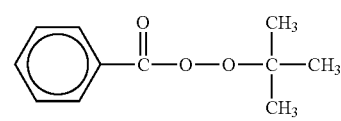

Control Example 1

The graphite powder used in Control Example 1 consisted of not more than 10% of particles larger than 40 mesh (420 μm in diameter), about 40% of particles between 40 mesh and 60 mesh (420-250 μm in diameter), and about 50% of particles between 60 mesh and 80 mesh (250-177 μm in diameter). The carbon nanotube (CNT) used in Control Example 1 was multi-walled CNT having a tube diameter of about 20 nm, a tube length of about 1 μm, and a specific surface area of about 170 m²/g.

Preparation of BMC Material and Specimen 1. 500 g of a solution was prepared by dissolving 375 g of vinyl ester resin resin and 42 g of styrene-monomer-diluted polystyrene (as a low shrinking agent) in 83 g of styrene monomer as a solvent. 9 g of TBPB was added as an initiator, 9 g of MgO was added as a tackifier, and 17.5 g of zinc stearate was added as a mold releasing agent.
2. The abovementioned solution was agitated in a motorized mixer at room temperature for 30 minutes.
3. The abovementioned solution, 1500 g of graphite powder and 2.4 g CNT were poured into a Bulk Molding Compound (BMC) kneader to be mixed homogeneously by forward-and-backward rotations for a kneading time of about 30 minutes. The kneading operation was stopped and the mixed material was removed from the mixer to be tackified at room temperature for 48 hours.
4. Prior to thermal compression of specimens, the material was divided into several lumps of molding material with each lump weighing 60 g.
5. A slab mold was fastened to the upper and lower platforms of a hot press. The pre-heating temperature of the molds were set to 140° C. After the temperature had reached the set point, the lump was disposed at the center of the molds and pressed with a pressure of 1000 psi to form a specimen. After 600 seconds, the mold was opened automatically, and the specimen was removed.

Examples 1-8

The steps in Control Example 1 were repeated to prepare lumps of molding material and specimens with additional electrical conductive carbon materials and clays being added to the BMC kneader, which are selected from Table 1 according to Table 2.

TABLE 1

|  | Amount added, g (%)* |
|---|---|
| Clays | |
| Montmorillonite (MMT) | 12 (3.2%) |
| Organic MMT | 12 (3.2%) |
| Ag-plated MMT | 12 (3.2%) |
| Electric conductive carbon materials[+] | |
| Carbon black | 60 (16%) |
| Carbon fiber | 48 (12.8%) |
| Ni-plated graphite | 120 (32%) |
| Ni-plated carbon fiber | 24 (6.4%) |

*%, based on the weight of vinyl ester resin

[+]Carbon fiber: length of 1.3 mm, yarn size of 10-12K; Ni-plated graphite powder: graphite powder of about 53 mesh number before plating, and having 60% of nickel plated on the surface, based on the weight of the graphite powder; Ni-plated carbon fiber: length of 1.3 mm, yarn size of 10-12 K, before plating, and having 28% of nickel plated on the surface, based on the weight of the carbon fiber

TABLE 2

|  | MMT | Ag-plated MMT | Organic MMT | Carbon black | Carbon fiber | Ni-plated graphite | Ni-plated carbon fiber |
|---|---|---|---|---|---|---|---|
| Control Ex. 1 | X | X | X | X | X | X | X |
| Ex. 1 | X | X | X | X | O | X | O |
| Ex. 2 | X | X | X | O | O | O | O |
| Ex. 3 | X | O | O | X | O | X | O |
| Ex. 4 | X | O | O | O | O | O | O |
| Ex. 5 | O | X | O | X | O | X | O |
| Ex. 6 | O | X | O | O | O | O | O |
| Ex. 7 | O | O | X | X | O | X | O |
| Ex. 8 | O | O | X | O | O | O | O |

X: no addition

O: addition

Electrical Properties:

Test Method:

A four-point probe resistivity meter was used by applying a voltage and an electric current on the surface of a specimen at one end, measuring at the other end the voltage and the electric current passed through the specimen, and using the Ohm's law to obtain the volume resistivity (ρ) of the specimen according to the formula, $$\rho = \frac{V}{I} * W * CF, \qquad \text{(formula 1)}$$

wherein V is the voltage passed through the specimen, I is the electric current passed through the specimen, a ratio thereof is the surface resistivity, W is the thickness of the specimen, and CF is the correction factor. The thermally compressed specimens from the example and the controls were about 100 mm×100 mm with a thickness of 3 mm. The correction factor (CF) for the specimens was 4.5. Formula 1 was used to obtain the volume resistivity (ρ) and an inversion of the volume resistivity is the electric conductivity of a specimen.

Results:

Table 3 shows the resistivity measured for the polymer composite bipolar plates prepared above. The measured resistivities for the polymer composite bipolar plates prepared in Examples 1-8 respectively are 4.28 mΩ, 4.03 mΩ, 4.71 mΩ, 5.05 mΩ, 5.25 mΩ, 4.88 mΩ, 5.14 mΩ, and 4.92 mΩ. The results indicate that addition of clay will raise the resistivity in comparison with the values of Examples 3-8 to Control Example 1; however, the increase is within acceptable range for the application of the bipolar plate. The results also indicate that addition of electrical conductive carbon materials will lower the resistivity in comparison with the values of Examples 1-2 to Control Example 1. Table 4 shows the electric conductivity measured for the polymer composite bipolar plates prepared above. Similar observations in Table 3 can also be found in Table 4.

TABLE 3

|  | Ex. 1 | Ex. 2 | Ex. 3 | Ex. 4 | Ex. 5 | Ex. 6 | Ex. 7 | Ex. 8 | Control Ex. 1 |
|---|---|---|---|---|---|---|---|---|---|
| Resistivity | 4.15 | 4.03 | 4.71 | 5.05 | 5.25 | 4.88 | 5.14 | 4.92 | 4.26 |

Unit: mΩ

TABLE 4

|  | Ex. 1 | Ex. 2 | Ex. 3 | Ex. 4 | Ex. 5 | Ex. 6 | Ex. 7 | Ex. 8 | Control Ex. 1 |
|---|---|---|---|---|---|---|---|---|---|
| Electric conductivity | 241 | 248 | 212 | 198 | 190 | 205 | 195 | 203 | 235 |

Unit: S/cm

Helium (He) Gas Permeability Test:

He gas leaking rate (torr. 1/sec) was measured by using a He gas leaking detector with a sensitivity of $2 \times 10^{-11}$ mbar.1/sec. The results are shown in Table 5.

Table 5 shows the He gas leaking rate measured for the polymer composite bipolar plates prepared above. The measured He gas leaking rates for the polymer composite bipolar plates prepared in Examples 1-8 respectively are $2.5 \times 10^{-6}$ cm$^3$/cm$^2$-sec, $2.7 \times 10^{-6}$ cm$^3$/cm$^2$-sec, $2.0 \times 10^{-6}$ cm$^3$/cm$^2$-sec, $1.4 \times 10$ cm$^3$/cm$^2$-sec, $2.0 \times 10^{-6}$ cm$^3$/cm$^2$-sec, $1.8 \times 10^{-6}$ cm$^3$/cm$^2$-sec, $2.2 \times 10^{-6}$ cm$^3$/cm$^2$-sec, and $2.0 \times 10^{-6}$ cm$^3$/cm$^2$-sec. The results indicate that addition of clay will lower the He gas leaking rate in comparison with the values of Examples 3-8 to Control Example 1, wherein the addition of the organic MMT shows the greatest effect. The results also indicate that addition of electrical conductive carbon materials will increase the He gas leaking rate in comparison with the values of Examples 1-2 to Control Example 1.

TABLE 5

|  | Ex. 1 | Ex. 2 | Ex. 3 | Ex. 4 | Ex. 5 | Ex. 6 | Ex. 7 | Ex. 8 | Control Ex. 1 |
|---|---|---|---|---|---|---|---|---|---|
| He gas leaking rate | 2.5 | 2.7 | 2.0 | 1.4 | 2.0 | 1.8 | 2.2 | 2.0 | 2.4 |

Unit: $1 \times 10^{-6}$ cm$^3$/cm$^2$-sec

Mechanical Property: Test for Flexural Strength
Method of Test: ASTM D790
Results:

Table 6 shows the test results of flexural strength for polymer composite bipolar plates prepared above. The measured flexural strength for the polymer composite bipolar plates prepared in Examples 1-8 respectively are 34.62 MPa, 35.56 MPa, 37.78 MPa, 38.53 MPa, 37.14 MPa, 38.44 MPa, 35.32 MPa, and 36.11 MPa. The results indicate that addition of clay will enhance the flexural strength in comparison with the values of Examples 3-8 to Control Example 1, wherein the addition of the organic MMT shows the greatest effect. The results also indicate that addition of carbon fiber materials also will increase the flexural strength in comparison with the values of Examples 1-2 to Control Example 1.

TABLE 6

|  | Ex. 1 | Ex. 2 | Ex. 3 | Ex. 4 | Ex. 5 | Ex. 6 | Ex. 7 | Ex. 8 | Control Ex. 1 |
|---|---|---|---|---|---|---|---|---|---|
| Flexural strength | 34.62 | 35.56 | 37.78 | 38.53 | 37.14 | 38.44 | 35.32 | 36.11 | 32.12 |

Unit: MPa

Mechanical Property: Test for Impact Strength
Method of Test: ASTM D256
Results:

Table 7 shows the test results of notched Izod impact strength for polymer composite bipolar plates prepared above. The measured notched Izod impact strength for the polymer composite bipolar plates prepared in Examples 1-8 respectively are 3.78 (J/m), 3.65 (J/m), 4.24 (J/m), 4.18 (J/m), 4.29 (J/m), 4.23 (J/m), 4.09 (J/m) and 4.03 (J/m). The results indicate that addition of clay will significantly enhance the notched Izod impact strength in comparison with the values of Examples 3-8 to Control Example 1, wherein the addition of the organic MMT shows the greatest effect. The results also indicate that addition of carbon fiber materials also will increase the flexural strength in comparison with the values of Examples 1-2 to Control Example 1.

TABLE 7

|  | Ex. 1 | Ex. 2 | Ex. 3 | Ex. 4 | Ex. 5 | Ex. 6 | Ex. 7 | Ex. 8 | Control Ex. 1 |
|---|---|---|---|---|---|---|---|---|---|
| Impact strength | 3.78 | 3.65 | 4.24 | 4.18 | 4.29 | 4.23 | 4.09 | 4.03 | 2.67 |

Unit: J/m

Heat Distortion Test:
Method of Test: ASTM G5-94
Results:

Table 8 shows the test results of heat distortion test for polymer composite bipolar plates prepared above. The measured heat distortion temperatures for the polymer composite bipolar plates prepared in Examples 1-8 respectively are 253° C., 264° C., 277° C., 286° C., 269° C., 273° C., 257° C., and 262° C. The results indicate that addition of clay will significantly enhance the heat distortion temperature in comparison with the values of Examples 3-8 to Control Example 1, wherein the addition of the organic MMT shows the greatest effect. The results also indicate that addition of carbon fiber, graphite or carbon black materials also will improve the heat distortion temperature in comparison with the values of Examples 1-2 to Control Example 1.

TABLE 8

| | Ex. 1 | Ex. 2 | Ex. 3 | Ex. 4 | Ex. 5 | Ex. 6 | Ex. 7 | Ex. 8 | Control Ex. 1 |
|---|---|---|---|---|---|---|---|---|---|
| Heat distortion temperature | 253 | 264 | 277 | 286 | 269 | 273 | 257 | 262 | 200 |

Unit: ° C.

Flame Retardancy Property: UL-94 Test
Method of Test: ASTM D-3801
Results:

A vertical combustion method specified in the flame retardancy standard was used, wherein the flame retardancy is classified into 94V-0, 94V-1 or 94V-2. During the testing, all specimens prepared in Examples 1-8 and Control Example 1 did not drip and, therefore, did not cause a cotton ball to burn.

Table 9 shows the test results of flame retardancy for polymer composite bipolar plates prepared above. The measured flame retardancy for all composite bipolar plates with additional clays and/or carbon materials all meet 94V-0 in the UL-94 test.

TABLE 9

| | Ex. 1 | Ex. 2 | Ex. 3 | Ex. 4 | Ex. 5 | Ex. 6 | Ex. 7 | Ex. 8 | Control Ex. 1 |
|---|---|---|---|---|---|---|---|---|---|
| UL-94 | 94V-0 | 94V-0 | 94V-0 | 94V-0 | 94V-0 | 94V-0 | 94V-0 | 94V-0 | 94V-0 |

The compositions for the BMC process in Examples 1-8 and Control Example 1 are substantially the same where the graphite powder used is about 75% based on the total weight of BMC compounding mixture, except the additions of electric conductive carbon materials and clays. In view of the above test results, the addition of clays, in particular the modified organo clay (organic MTT), can improve the mechanical properties and the gas permeability-resistance, and can increase the heat distortion temperature of the polymer composite bipolar plates as evidenced by the data of Examples 3-8 and Control Example 1; however, the addition of clays inevitably lowers the electrical properties of the polymer composite bipolar plates. In comparison with the data of Examples 1-2 to Control Example 1, the addition of electrical conductive carbon materials will improve the electrical properties of the polymer composite bipolar plates, so that the electrical properties of the polymer composite bipolar plates prepared in Examples 3-8 are still within acceptable range for the application of the bipolar plate.

The invention claimed is:

1. A method for preparing a fuel cell composite bipolar plate, which comprises:

a) compounding vinyl ester and graphite powder to form bulk molding compound (BMC) material, the graphite powder content ranging from 60 wt % to 95 wt % based on the total weight of the graphite powder and vinyl ester, wherein 1-20 wt % carbon fiber, 0.5-10 wt % modified organo clay or noble metal plated modified organo clay, 0.5-10 wt % nickel plated carbon fiber or 2.5-40 wt % nickel plated graphite, and one or more conductive fillers selected from the group consisting of 0.1-5 wt % carbon nanotube (CNT), and 2-30 wt % carbon black, based on the weight of the vinyl ester resin, are added during the compounding;

b) molding the BMC material from step a) to form a bipolar plate having a desired shaped at 80-200° C. and 500-4000 psi;

and wherein said modified organo clay in step a) is prepared by conducting an cationic exchange between a modifier and a clay in an acidic solution, separating the resulting ion-exchanged clay from the acidic solution, and drying the ion-exchanged clay, wherein the modifier is used in a ratio of the modifier to the clay of 0.1-10% by weight.

2. The method as claimed in claim 1, wherein said modifier comprises a C6-C18 alkane having an amino group and an active hydrogen.

3. The method as claimed in claim 2, wherein said modifier is 1,12-diaminododecane.

4. The method as claimed in claim 1, wherein said clay comprises an inorganic layer-type clay having an interlayer space of 8-12 Å and a cation exchange capacity (CEC) of 50-140 meq/100 g.

5. The method as claimed in claim 4, wherein said clay is Montmorillonite, Saponite, Hectorite, Attapulgite, zirconium phosphate, Illite, Mica, Kaolinite or Chlorite.

6. The method as claimed in claim 1, wherein said noble metal plated modified organo clay is added during the compounding in step a), and said noble metal plated modified organo clay is prepared by conducting an cationic exchange between a modifier and a clay in an acidic solution, separating the resulting ion-exchanged clay from the acidic solution, drying the ion-exchanged clay to obtain a modified organo clay, wherein the modifier is used in a ratio of the modifier to the clay of 0.1-10% by weight; mixing the modified organo clay with a plating solution having noble metal ions dissolved therein; adding a reducing agent to the resulting mixture of said the plating solution and said modified organo clay, so that the noble metal ions are reduced to deposit on said modified organo clay in the form of elemental metal; recovering the noble metal plated modified organo clay by solid-liquid separation; and drying the noble metal plated modified organo clay.

7. The method as claimed in claim 6, wherein said modifier comprises a C6-C18 alkane having an amino group and an active hydrogen.

8. The method as claimed in claim 7, wherein said modifier is 1,12-diaminododecane.

9. The method as claimed in claim 6, wherein said clay comprises an inorganic layer-type clay having an interlayer space of 8-12 Å and a cation exchange capacity (CEC) of 50-140 meq/100 g.

10. The method as claimed in claim 9, wherein said clay is Montmorillonite, Saponite, Hectorite, Attapulgite, zirconium phosphate, Illite, Mica, Kaolinite or Chlorite.

11. The method as claimed in claim 9, wherein said plating solution comprises an aqueous solution with ions of Ag, Cu or Ni dissolved therein.

12. The method as claimed in claim 11, wherein said plating solution comprises an aqueous solution of $AgNO_3$, $Cu(NO_3)_2$, or $Ni(NO_3)_3$.

13. The method as claimed in claim 12, wherein said plating solution is an aqueous solution of $AgNO_3$.

14. The method as claimed in claim 9, wherein said reducing agent is $NaBH_4$, $LiB(C_2H_5)_3H$, $LiAlH_4$, formaldehyde or glucose.

15. The method as claimed in claim 14, wherein said reducing agent is $NaBH_4$.

16. The method as claimed in claim 1, wherein particles of said graphite powder have a size of 10-80 mesh.

17. The method as claimed in claim 16, wherein less than 10 wt % of the particles of the graphite powder are larger than 40 mesh, and the remaining particles of the graphite powder have a size of 40-80 mesh.

18. The method as claimed in claim 6, wherein particles of said graphite powder have a size of 10-80 mesh.

19. The method as claimed in claim 18, wherein less than 10 wt % of the particles of the graphite powder are larger than 40 mesh, and the remaining particles of the graphite powder have a size of 40-80 mesh.

* * * * *